United States Patent [19]

Kemmler

[11] Patent Number: 4,922,952

[45] Date of Patent: May 8, 1990

[54] PNEUMATIC CONTROL VALVE

[75] Inventor: Lothar Kemmler, Mörfelden, Fed. Rep. of Germany

[73] Assignee: Samson AG, Frankfurt, Fed. Rep. of Germany

[21] Appl. No.: 232,501

[22] Filed: Aug. 15, 1988

[30] Foreign Application Priority Data

Aug. 13, 1987 [DE] Fed. Rep. of Germany ...... 37.27008

[51] Int. Cl.⁵ .............................................. G05B 11/44
[52] U.S. Cl. ..................................... 137/382; 91/387; 137/85; 251/28
[58] Field of Search ............... 91/387; 137/85, 382; 251/28

[56] References Cited

U.S. PATENT DOCUMENTS

| | | | |
|---|---|---|---|
| 2,264,262 | 11/1941 | Erbguth | 91/387 X |
| 2,298,112 | 10/1942 | Edwards | 137/85 |
| 2,331,502 | 10/1943 | Ray | 19/387 X |
| 2,399,938 | 5/1946 | Pett | 251/29 X |
| 2,536,184 | 1/1951 | Johnson | 91/387 |
| 2,575,085 | 11/1951 | Alyea | 91/387 X |
| 2,811,138 | 10/1957 | Clements | 91/387 |
| 2,942,581 | 6/1960 | Gaffney | 91/387 X |
| 3,087,468 | 4/1963 | Roberts et al. | 91/387 X |
| 4,343,224 | 8/1982 | Kemmler | 91/387 X |
| 4,509,403 | 4/1985 | Gassman et al. | 91/387 X |

Primary Examiner—Gerald A. Michalsky
Attorney, Agent, or Firm—Toren, McGeady & Associates

[57] ABSTRACT

A pneumatic control valve comprises a position controller and a valve which is influenced by the controller. A valve member can be lifted by means of a servomotor which is securely connected to the valve housing by means of a yoke, the servomotor being connected to the valve member by means of a valve rod. The lift position of the valve rod is sensed by means of a rotatable lever of the position controller, which rotatable lever is in a working connection with the valve rod by means of an articulated device. A housing encloses the valve rod, the lever and the articulated device.

10 Claims, 2 Drawing Sheets

PNEUMATIC CONTROL VALVE

FIELD AND BACKGROUND OF THE INVENTION

The present invention relates, in general to pneumatic control or regulating valves, and, in particular, to a new and useful valve arrangement having a servomotor, a position controller with a rotatable lever and a valve rod engaged with the servomotor and lever.

German Patent No. 31 16 640 discloses pneumatic control valves comprising a pneumatic servomotor or motor operator, a position controller with pneumatic output, a valve rod between the servomotor and a valve cone or face of the valve which is arranged in a valve housing, an articulated device between a rotatable lever of the position controller and the valve rod, which lever senses the lift position of the valve cone, and a yoke, which securely connects the servomotor with the valve housing. The position controller ensures that a given assignment or allocation for the valve cone position, acting as a controlled variable for an actuating signal is used as a command variable. The position controller compares the actuating signal coming from a pneumatic or electropneumatic regulating or control device with the lift of the valve cone and, when the assignment of the actuating signal to the valve cone lift is faulty, changes the pressure in the servomotor, which preferably operates pneumatically, until the valve cone is in the given relation to the actuating signal.

In order to meet this object, the position of the valve rod relative to the valve housing must be represented or mapped, and a distinction must be made between two groups of position controllers.

In the first group, which generally works according to force comparison, the end of a usually helical spring, or an equivalent structural component part, is securely connected to the valve rod, while the other end is in a working connection with a comparison diaphragm, upon which the air pressure representing the actuating signal also acts. When there is an imbalance between the forces acting upon the comparison diaphragm, an actuator and an amplifier are controlled in such a way that the pressure on the pneumatic servomotor assumes exactly the value with which the desired motor position is constrained, regardless of external, error inducing forces on the valve cone, etc., e.g. friction or flow forces. See German patent application No. P 36 37 068.1. In the following this type of arrangement is referred to as a position controller with translational input.

In addition, position controllers are known which comprise a rotatable lever which is entrained by the valve rod. The angle of the lever relative to an off or neutral position, is a representation of the valve lift. See German patent No. 31 16 640. This group of position controllers operates frequently, but not always, with path comparison. They will be designated in the following as position controllers with rotational inputs.

Positional controllers with rotational inputs are found substantially more often than those with translational inputs, particularly because they can be more easily adapted to the geometric properties of the various pneumatic control valves.

Both groups of position controllers, particularly when used in heavy-duty operation in chemical plants, have the disadvantage that the parts located outside of the position controller housing, namely levers with valve rod articulation or representation springs, can be damaged easily. Such damage comes about because these parts are often exposed to intensive corrosion or because, when the servo-devices are relacquered, these parts are lacquered along with them, so that the position controller is maladjusted. Finally, there is the risk of accident by contact with a person, particularly if the on-site conditions are cramped.

In connection with the position controllers with translational input, mentioned above, it has already been suggested to accommodate representation springs in a closed housing which is generally ventilated.

SUMMARY OF THE INVENTION

An object of the present invention is to develop a valve arrangement which is similar to that disclosed in German patent No. 31 16 640, but in such a way that even the parts serving to represent and transmit the valve position to the position controller are protected against access from the outside and, accordingly, against being influenced and/or damaged, without sacrificing easy exchangeability.

Accordingly, a further object of the present invention is to provide a valve arrangement comprising a valve housing, a valve rod which is movably engaged to the valve housing for moving a valve member therein for opening and closing a passage through the valve housing, a pneumatic servomotor connected to the valve rod for moving the valve rod, yoke means connected between the servomotor and the valve housing for securing the servomotor to the valve housing, a position controller having a pneumatic output and a rotatable lever which is movable to control the pneumatic output, articulating means operatively connecting the rotatable lever to the valve rod and a protective housing enclosing the valve rod, the rotatable lever and the articulating means.

As a result of the inventive construction, the input lever of the position controller and the articulating means or device connected to the valve rod are now also accommodated in a space which is enclosed on all sides and separates these parts from the outer atmosphere, so that corrosion, soiling and the risk of accident are eliminated. It is advantageous if this space is additionally ventilated.

The yoke means may be formed by a stay bolt pin yoke, spacer bolt yoke, stud bolt yoke or compact yoke, which connects the valve housing to the servomotor. The valve housing contains the valve member or cone for the purpose of influencing the mass flow to be actuated. The valve housing is fastened at the stay bolt of the stay bolt yoke by means of brackets or is connected to the compact yoke and the motor.

Another advantage results from a two-part construction of the protective housing, since the valve rod can be accommodated in one part of the housing and the position controller, with the rotatable lever, can be accommodated in the other part of the housing, which has favorable results for assembly and maintenance work.

A particularly favorable construction results if the housing is formed as a compact yoke connecting the valve housing, which contains the valve seat, and with the servomotor, which preferably operates pneumatically.

The invention is described in the following by means of three embodiments shown more or less schematically in the drawing.

A further object of the present invention is to provide a valve arrangement which is simple in design, rugged in construction and economical to manufacture.

The various features of novelty which characterize the invention are pointed out with particularity in the claims annexed to and forming a part of this disclosure. For a understanding of the invention, its operating advantages and specific objects attained by its use, reference should be had to the drawings and descriptive matter in which there are illustrated and described preferred embodiments of the invention.

DESCRIPTION OF THE PREFERRED EMBODIMENT

Figure 3:
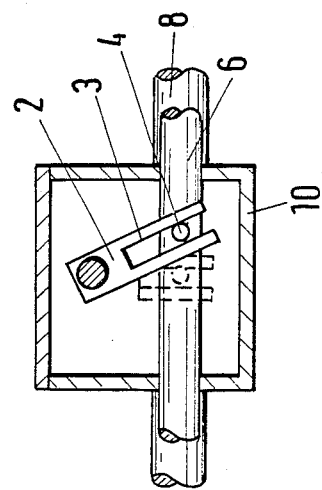
FIG. 3 is a sectional view taken on line III—III of FIG. 2.
Figure 1:
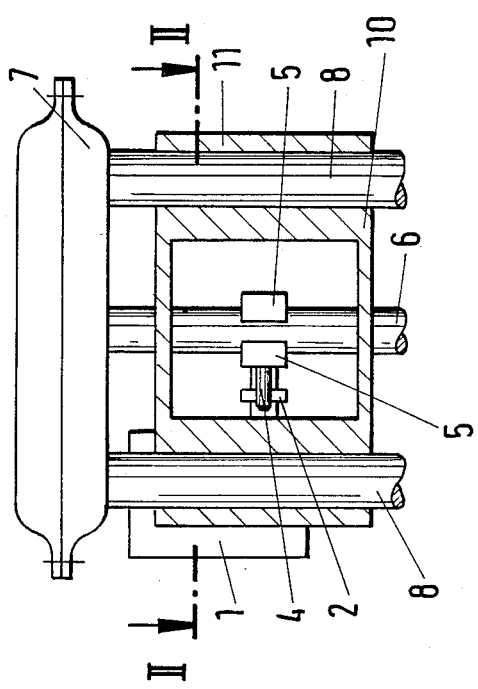
FIG. 1 is side elevational view, partly in section, of a first embodiment of the arrangement according to the invention, comprising a stay bolt yoke, but without a valve body.
Figure 2:
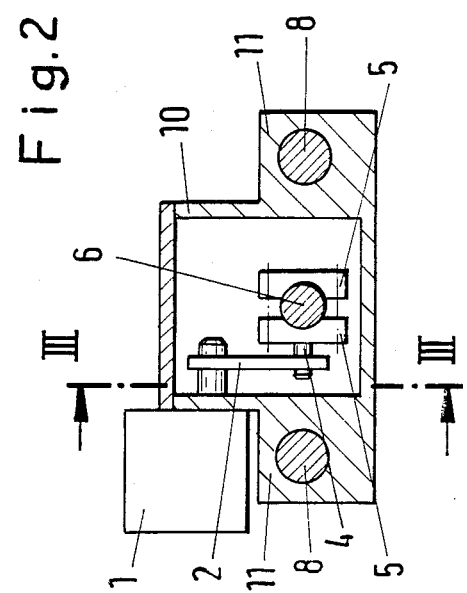
FIG. 2 is a sectional view taken on line II—II of FIG. 1.

In FIGS. 1 to 3, a conventional position controller with rotational input is designated by reference number 1 and includes a rotational lever 2. The lever 2 comprises a forklike cut out portion 3, which engages an articulated pin 4. The articulated pin 4 is fastened to a valve rod 6 of a pneumatic control valve by means of clips or clamps 5 so as to be detachable or displaceable on the rod. The position of the valve rod 6 is transmitted into the interior of the position controller 1 by means of the cooperation of the structural component parts 2 to 4.

Figure 4:
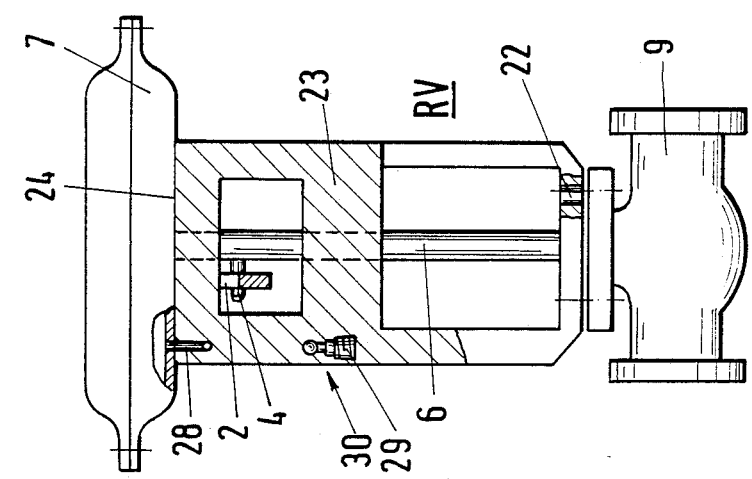
FIG. 4 is a partly sectional side view of a second embodiment of the arrangement according to the invention, with a compact yoke and a valve body.

The valve rod 6 leads to the valve body 9 of the control valve RV via a stuffing-box 12, as shown in FIG. 4, and is connected to a pneumatic servomotor 7, which is constructed as a diaphragm motor. In FIGS. 1 to 3, the servomotor 7 is securely connected to the valve housing (not shown in FIG. 2) of the control valve by means of a stay bolt yoke 8 comprising two stay bolts.

The lever 2 and the articulated device 3,4, as well as a portion of the valve rod 6, are accommodated by an outwardly closed housing 10, which is fastened at the stay bolt yoke 8 by means of two brackets 11. The valve rod 6 can be displaced within the housing 10 with or without additional seals, not shown here.

Figure 5:
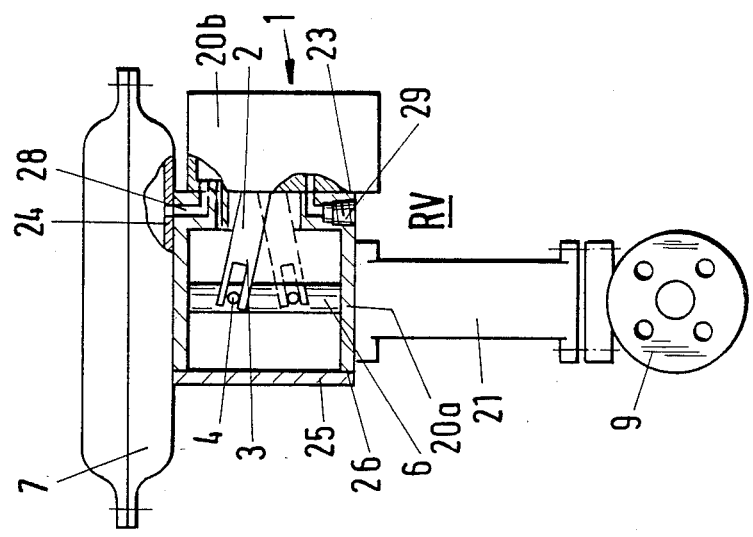
FIG. 5 is a partly sectional frontal view of the arrangement according to FIG. 4.

FIGS. 4 and 5 show another embodiment of the invention in a control valve RV comprising a forged or cast compact yoke 21. In this embodiment the valve housing 9 is rigidly connected to the servomotor 7 by means of the compact yoke 21, which has holes at its two ends, only one of which is shown at 22 in FIG. 4. By means of the holes, the compact yoke is bolted or screwed to the valve body 9 of the control valve RV on the one hand and to the servomotor 7 by means of a housing 20, on the other hand, the housing 20 consisting of the housing parts 20a and 20b.

Also provided in the embodiment according to FIGS. 4 and 5, are a position controller 1 with its lever 2, the articulated device 3,4, the valve rod 6 and the servomotor 7, which is also constructed in this instance as a pneumatic servomotor. The housing 20 provided in this embodiment likewise encloses the valve rod 6, the articulated device 3, 4 and the lever 2, which also has a fork-like cut out portion 3.

In contrast to the housing 10, the housing 20 is constructed in two parts in such a way that the position controller 1 can be removed from the control valve RV without the need of extensive preliminary disassembly work, as in the embodiment according to FIGS. 1 to 3, for example.

By using suitable fashioning and selection of work material, the housing part 20a is provided with a high mechanical strength such that it can be inserted between the upper end of the compact yoke 21 and the pneumatic servomotor 7 without disturbing the functioning of the control valve because of excessive deformation, for example. The housing part 20a constructed in this way comprises at least one sealing surface 23, by means of which the position controller can be sealed to the housing part 20a as a housing part 20b. In addition, it is advisable to provide a sealing surface 24 between the housing part 20a and the servomotor 7 and, finally, to provide a cover 25 with a sealing surface 26.

In addition, a compressed-air connection 28 is provided in the housing 20, which compressed-air connection 28 connects the output of the position controller 1 with the air space or chamber of the pneumatic motor 7. Finally, a compressed-air connection 29, through which the supply air is directed to the position controller 1 via the housing 20, is provided in the housing 20. Of course, electrical connection line can also be arranged in the housing 20 if electrical power is needed in the position controller 1, e.g. in case the latter is an electropneumatic position controller. In order to ensure the impermeability of the surfaces 23, 24 and 26, the structural component parts 20a, 7 and 25 are screwed together with 20b, 20a and 20a, respectively, by means of screws or are fastened in a similar manner.

A housing constructed in this way has the following advantages: If it is necessary to inspect or repair the position controller 1, it can easily be removed from the housing 20 by means of disengaging the sealing screws, and can be replaced by another. By taking off the cover 25, one may observe whether or not the articulated pin 4 is correctly embraced by the recess 3 in the lever 2. Since it is also ensured that the exhaust air of the position controller 1 reaches the atmosphere via the housing 20, no corrosive outer atmosphere can stay within the housing.

In addition to the protection of the mechanical input parts of the position controller, the latter can also be removed and mounted on the servo-valve without the need of detaching and restoring the otherwise necessary pipeline screw connections or electrical plug-in connections.

Figure 6:
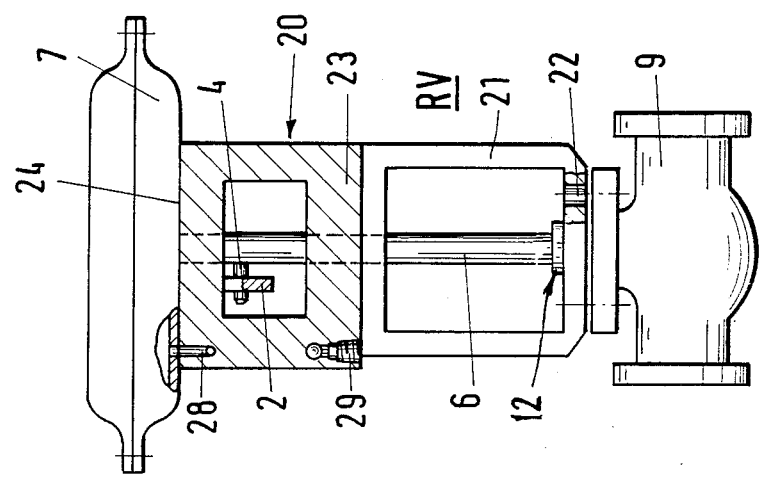
FIG. 6 is a partly sectional side view of a third embodiment of the arrangement according to the invention, with a compact yoke and a valve body.

In the third embodiment according to FIG. 6, the housing 30, which encloses the valve rod 6, articulated device 3,4 and lever 2 of the position controller of the control valve RV, forms the compact yoke. Moreover, the housing 30 is constructed in the manner described in connection with the housing 20 according to FIGS. 4 and 5, the position controller 1 is therefore likewise constructed as a housing part which is sealed on the housing part constructed as a compact yoke, and therefore also possesses is advantages. Moreover, another advantage is in that a special yoke part is dispensed with in a control valve constructed in such a way, which has favorable results for assembly and maintenance.

Of course, the described arrangement can also comprise a valve flap or a slider or gate instead of a valve cone.

While specific embodiments of the invention has been shown and described in detail to illustrate the application of the inventive principles, it will be understood that the invention may be embodied otherwise without departing from such principles.

What is claimed is:

1. A valve arrangement comprising:
   a valve housing for containing a movable valve member which is mmovable for opening and closing passage through the valve housing, said valve housing having a stuffing-box;
   a valve rod movably engaged with said valve housing and enclosed in said stuffing-box for moving the valve member for opening and closing passage through the valve housing;
   a pneumatic servomotor connected to said valve rod for moving said valve rod;
   yoke means connected between said servomotor and said valve housing for securing said servomotor to said valve housing;
   a position controller having a controllable pneumatic output and a rotatable lever rotatable to control the controllable pneumatic output;
   articulating means operative connecting said rotatable lever to said valve rod for transmitting movement of said valve rod into rotation of said rotatable lever; and
   a protective housing enclosing at least part of said valve rod, said rotatable lever and said articulating means for protecting said valve rod, said rotatable lever and said articulating means from outside influences, said protective housing being arranged outside a diaphragm space of said servomotor and between said servomotor and said yoke means so as to allow access to said stuffing-box of said valve housing.

2. An arrangement according to claim 1, wherein said yoke means comprises a compact yoke connected to said valve housing.

3. An arrangement according to claim 1, wherein said yoke means comprises an extension of said protective housing, said protective housing and extension being fixed between said servomotor and said valve housing.

4. An arrangement according to claim 1, wherein said protective housing comprises a first housing part containing at least a portion of said valve rod, said rotatable lever and said articulating means, and a second housing part containing said controller, said first and second housing parts being detachably connected to each other.

5. An arrangement according to claim 4, wherein said first housing part is detachably connected to said servomotor, said arrangement including sealing means between said first housing part and said servomotor.

6. An arrangement according to claim 4, including a cover detachably connected to said first housing part for opening and closing said first housing part and sealing means connected between said detachable cover and the first housing part for sealing said cover to said first housing part.

7. An arrangement according to claim 4, including passages in the first and second housing parts for establishing communication between said servomotor and said position controller.

8. An arrangement according to claim 1, wherein said protective housing includes at least one venting opening therethrough.

9. An arrangement according to claim 8, wherein said venting opening comprises a bore communicating an interior of said protective housing with an interior of said pneumatic position controller for exhausting air from said pneumatic position controller into said protective housing.

10. An arrangement accoridng to claim 1, wherein said protective housing includes an opening for a pneumatic supply connection.

* * * * *